May 19, 1931. W. R. BORST 1,805,682
SEWAGE TREATMENT
Filed Nov. 11, 1927
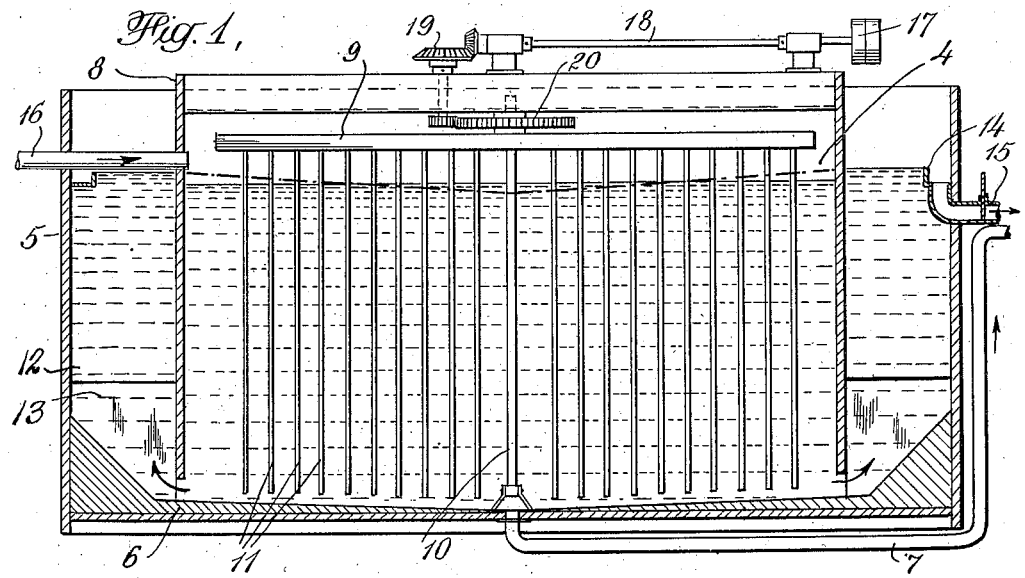
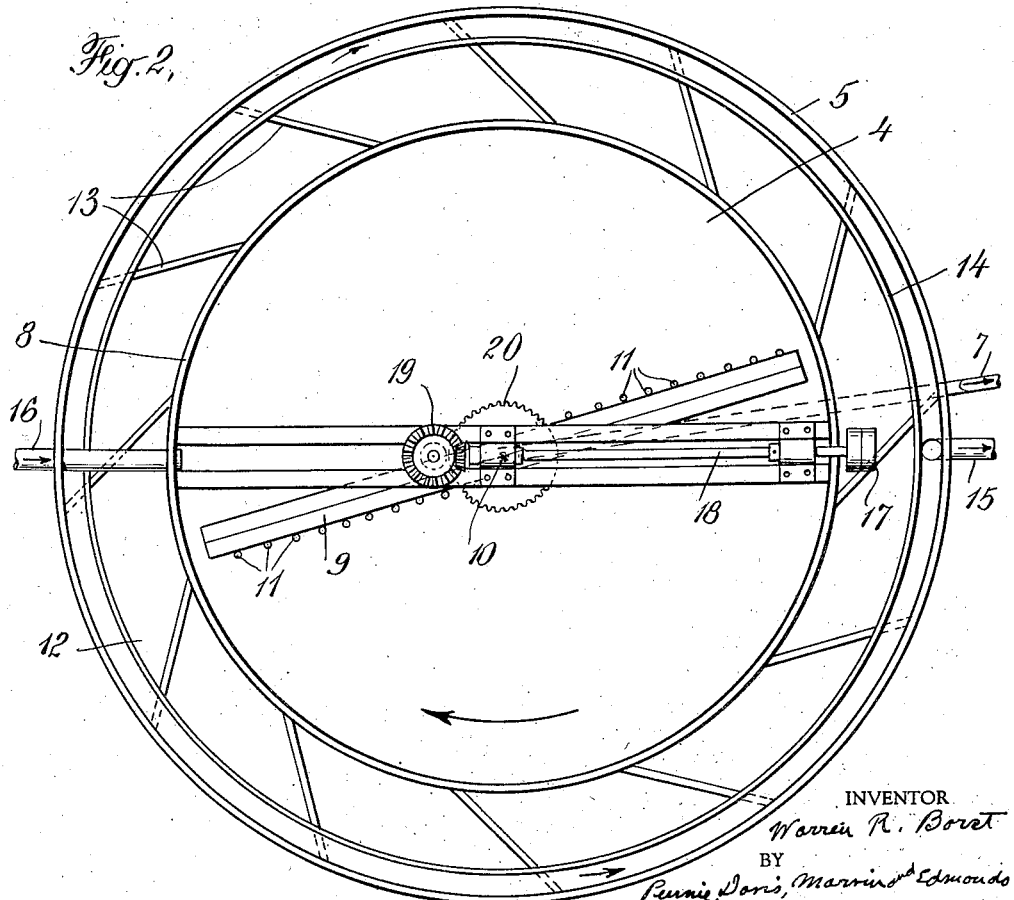

Patented May 19, 1931

1,805,682

UNITED STATES PATENT OFFICE

WARREN R. BORST, OF WEST NEW BRIGHTON, NEW YORK

SEWAGE TREATMENT

Application filed November 11, 1927. Serial No. 232,600.

This invention relates to sewage treatment, and has for its object the provision of an improved method of and apparatus for treating sewage.

Domestic or municipal sewage contains large amounts of putrescible organic material as well as solids, largely organic, which must be either removed or changed into an inoffensive, non-putrescible form before the sewage may be discharged into the sea, rivers or the like. The solid portions of municipal sewage, in the nature of paper and fabrics, if discharged into rivers are particularly offensive because of the unsightly condition of the banks and surface of the river for some considerable distance below the point of discharge. This condition exists even though the volume of sewage is not great enough to thoroughly pollute or foul the waters of the river itself.

In the heretofore customary methods of combating this problem various expedients have been resorted to for freeing the large volumes of liquid of their burden of solids both putrescible and non-putrescible. Various methods of screening or of filtering the solid portions from the liquid portions are in use. Mechanical screening methods are for the most part open to the objection that due to the semi-colloidal nature of the material being screened and the large volumes of liquid to be handled a large portion of the solid materials passes through the screen. A considerable portion of the solids passing through the screen is putrescible and consequently objectionable when it issues in large volumes into a stream, river or the like. It is also impossible for the screens to retain or change in any way the large volume of putrescible organic material which is already in solution in municipal sewage.

In the heretofore customary manner of treating municipal sewage it is often also a common practice to remove some of the solids and putrescible material by the activated sludge method. In accordance with this method the sewage is, by various procedures, treated with air or oxygen in the presence of aerobic bacteria until the solids and putrescible matters aggomlerate or flocculate in the form of a sludge which settles to the bottom of the treating compartment and is withdrawn therefrom with as little liquid as possible. This sludge is then treated in a suitable manner to make it available as a fertilizer material.

There are also other sewage treatment processes which make use of anaerobic bacteria to digest the solids and thus diminish the quantity of sludge formed. Some systems of sewage treatment make use of combinations of these methods. Certain of these combination systems make use of screening, anaerobic bacteria and aerobic bacteria.

I have found that the essential agents for practical sewage treatment are provided by nature. The action of the soil bacteria aided by atmospheric oxygen eventually converts into harmless mineral ingredients all organic matter that comes within the sphere of their activity. The process is analogous to that of combustion, but is carried out at a much slower rate. Sewage treatment, as usually practiced, is but an intensive application of this natural process under controllable conditions. Improvements which have been made in the method of treating sewage have not involved the discovery of any new basic principles, but rather the application of these principles in new methods and apparatus, which have increased the working efficiency of the biochemical and other agencies; the constant aim having been to increase the rate at which these wastes can be treated efficiently and economically in a given area.

The organic matters in sewage wastes are complex and unstable substances, readily decomposed by certain bio-chemical agencies, and inasmuch as these agencies are always present and have the power of multiplying with tremendous rapidity, the changes wrought by them in the character of these wastes are both rapid and profound. The nature of these changes depends upon the nature of the agencies acting upon the organic matter and this in turn depends upon the presence or absence of a supply of dissolved oxygen.

The present invention is concerned solely with those processes of sewage treatment and reduction of wastes by the bio-chemical agencies in the presence of dissolved oxygen. I have heretofore discovered that this oxygen may be readily obtained from the atmosphere, through the exposed surface of the sewage by means of suitable agitation, thus permitting the oxygen to diffuse or stream downward from the surface through the main body of the sewage material.

In the heretofore customary methods of treating sewage by the activated sludge process, only sufficient oxygen is furnished to assure the desired activity for the proper functioning of the bio-chemical agencies in rendering the organic matter innocuous, and permitting its ready removal from the sewage. I have discovered that it is advantageous to supplement the bio-chemical agencies with mechanical agitation which aids in reducing the organic wastes to a colloidal condition, in which condition the bio-chemical reaction is more effective. The basic principles involved in my improved method of treating foul wastes are similar to the actions taking place when such foul wastes are discharged into a rapidly flowing stream.

It is a well known fact that every stream has a certain maximum natural capacity for the bio-chemical disposal of common organic wastes, according as given circumstances permit a greater or less depletion of that natural capacity. A polluting load of stated amount of sewage waste brings about, within a certain distance, a definite reduction in stream quality; after which the operation of self-purification begins and the stream quality rises again toward normal. The condition that exists for self-purification in streams is obtained in the method and apparatus of the invention with the added advantage that the operations in the treatment of sewage in accordance with the invention are at all times under control.

From my investigations I have found that when a body of sewage, in contact at its upper surface with atmospheric oxygen, is suitably agitated, the agitation accomplishes definite beneficial results in the treatment of sewage. The surface agitation continuously brings in contact with the oxygen of the air fresh portions of the sewage. These fresh portions appearing at the surface immediately become aerated and the dissolved oxygen immediately begins streaming downward through the liquid. This downward movement of the absorbed oxygen is materially aided by the proper type of agitation in the body of the sewage. The agitator may advantageously be of such construction and driven at such a speed that its mechanical action aids in breaking up the solid materials in the sewage. Thus, the whole body of sewage under treatment soon is brought into a condition that is best suited for the bio-chemical reactions to take place. These bio-chemical reactions under such aerated conditions are conducive to the most advantageous action of the aerobic bacteria. This condition is maintained for a sufficient period so that the solid materials of the foul wastes are converted entirely into a stable innocuous, non-putrescible, colloidal condition. When this condition is attained, the material under treatment is ready for withdrawal from the treatment compartment, and it may then be safely discharged into flowing streams or the like.

A practical application to sewage treatment of the aforementioned principles underlying the present invention will be understood from the following description taken in conjunction with the accompanying drawings; in which:

Fig. 1 is a sectional elevation of an apparatus particularly adapted for carrying out the method of the invention; and Fig. 2 is a top plan of the same apparatus.

The apparatus illustrated in the accompanying drawings comprises a circular tank 5 which may advantageously be built of wood, concrete, or other appropriate material. The bottom portion 6 of the tank may be either flat or very slightly inclined toward the center. A pipe 7 communicates with the interior of the tank at the center of the bottom portion and serves for intermittently withdrawing insoluble solids (largely inorganic) which may accumulate from time to time in the central portion of the bottom of the tank. The withdrawal of such solids is accomplished by means of a pump not shown.

Concentrically suspended within the tank 5 is a circular baffle 8, the walls of which extend from above the normal operating liquid level in the tank to within a few inches of the bottom of the tank. The baffle thus divides the tank into an inner aerating and agitating chamber 4 and outer annular settling compartment 12. Within the chamber 4 there is provided an agitator 9 carried on a centrally located and vertically disposed shaft 10 adapted to revolve on its axis. The agitator is provided with a series of vertically disposed agitating rakes 11 depending downwardly in the tank. The rakes 11 may advantageously be galvanized rods of sufficient mechanical strength to meet the demands of the apparatus, and spaced about 8″ apart, and secured to the upper transverse member of the agitator. The agitating rakes extend downwardly through the liquid material in the tank to within a few inches of the bottom.

Deflector plates 13 are mounted in the annular compartment 12 between the walls of the tank 5 and the baffle 8. The deflector plates are arranged at an angle of about 90° in respect to the radii of the tank, with their outer ends in advance of their inner ends with respect to the direction of rotation of the agitator. The deflector plates extend upwardly from the bottom of the tank to an appropriate distance above the lower edge of the baffle 8. The annular compartment 12 is provided with a circular overflow launder 14 having an outlet pipe 15. This launder is so arranged that its upper or overflow edge is substantially at the high liquid level of the tank.

The operation of the apparatus will be better understood from the following description: The tank is filled with sewage from an inlet pipe 16, discharging into the chamber 4 just slightly above the normal operating liquid level. The agitator is driven by any appropriate means, as for instance, through a pulley 17, shaft 18, level gears 19 and gearing 20. The direction of rotation of the agitator is determined by the direction in which the deflector plates 13 are placed; being always in the direction in which the deflector plates point as viewed from the exterior of the tank. The material within the chamber 4 revolves with the agitator and attains a speed approximately that of the agitator. The deflector plates 13 serve a dual purpose. First, they deflect solids away from the sedimentation compartment 12 back into the aeration chamber 4 of the tank, and secondly, that portion of the deflector plates extending up into the annular sedimentation compartment 12 assists in retarding circular flow of the liquid in this compartment, thus permitting the liquid in this compartment to be in a relatively quiescent condition from which any solids may settle out and be returned to the aeration and agitation chamber. The innocuous liquid at the top of the compartment 12 overflows into the launder 14, and is withdrawn through the outlet pipe 15.

Due to the rotation of the agitator rakes the whole body of liquid and solids within the agitation chamber 4 attains a circular motion. This circular motion of the liquid causes the liquid within the tank to attain a slight vortex at the center with a consequent rise at the edge of the tank. During the operation of the apparatus, this rise of liquid at the edge of the tank may amount to several inches. The vortex of the swirling liquid in the tank assists in drawing the solid matters in suspension toward the center of the tank, thus permitting the liquid near the baffle wall to be relatively free from solids. The deflection of the liquid from the deflector plates also aids in forcing the solid matters from the outer edge of the tank toward the vortex at the center.

In the practice of the invention it may be found necessary during the initial stages of the process to seed the tank with the proper type of aerobic bacteria, but usually this is not necessary, since the proper type of aerobic bacteria are generally present in normal municipal sewage. Where seeding has been found necessary, the seeding has been accomplished by collecting from the banks of streams into which the sewage is flowing the slimy film covering the large stones and placing this within the agitation chamber of the tank.

During the operation of the tank, the agitator rakes disturb the surface of the liquid and cause the surface to be aerated and consequently to absorb oxygen from the atmosphere. This oxygen streams downwardly through the body of liquid in the tank which, due to the construction of the agitator and rakes, is in continual motion. Thus, within a short space of time the whole body of liquid within the tank is thoroughly saturated with absorbed oxygen and consequently in the proper condition to support the life of aerobic bacteria and to foster their multiplication and activity.

The mechanical action of the agitator rakes whipping through the solution assists in a mechanical way to break up the solid materials in suspension in the liquid and in this way assists the action of the aerobic bacteria by affording them a greater surface of solids upon which to work. Within a very short period the aerobic bacteria act on the solid material in suspension and break it down either into substances which are soluble or into a very fine colloidal matter which remains indefinitely in suspension in water. The retention of the solid matters in the central portion of the tank, due to the vortex of the liquid also assists the aerobic bacteria by giving them a longer period in which to react upon the more resistant of the solid materials.

The material rising in the annular sedimentation compartment normally contains nothing but liquids and very fine colloidal material. All of the material carried to the upper portion and into the launder at the top of this annular compartment is in a thoroughly innocuous state and will not undergo any further decomposition no matter how long the material flowing from the tank is kept.

The time of flow of liquid through the tank from the time that it enters through the intake pipe 16 until it is discharged through the exit pipe 15, is only a few hours and under favorable conditions may be only two to four hours. This, however, does not mean that the aerobic bacteria within the tank entirely digest all of the solids entering the tank within this period of time, since a large portion of the solids present in the entering sewage remain in the tank, held by the vortex of the swirling liquid and the action of the deflector plates until they are entirely digested by the aerobic bacteria.

It has been found that the accumulation of solid material upon the bottom of the tank is extremely slow especially where a grit chamber is placed ahead of the tank in which the invention of the present application is incarried out. This grit chamber is placed in the inflowing line purely for the purpose of removing insoluble materials in the nature of sand and grit, and it is not contemplated that the material will remain in the sedimentation tank long enough for any substantial bacterial action to take place. Working under these conditions, it has been found that the material collecting in the bottom of the tank 5 need not be withdrawn through the withdrawal pipe 7 oftener than once every few months. The material withdrawn through the bottom of the tank in this manner usually contains a very high proportion of inorganic matter, thus determining definitely that the material thus deposited is of such a nature that aerobic bacteria could not under any circumstances digest it.

Although I have illustrated and described a certain type of tank, I do not wish to confine myself to the apparatus shown and described. Any suitable tank with the proper baffles, deflectors and agitation devices may be used in practicing the method of the invention. The effluent may be withdrawn from the tank in any suitable manner as for instance through openings in the side of the tank or it may overflow the edge of the tank. Certain waste materials especially industrial wastes according to their composition require special chemicals for their reduction. These may be added in the agitation compartment as long as they do not interfere with the action of the aerobic bacteria.

Without departing from the spirit of the invention, the baffle separating the annular sedimentation compartment from the central aerating chamber may be lowered so that it rests upon the floor of the tank. Thus the flow of liquid thereunder will be stopped. The cessation of liquid flow under the baffle causes the flow of liquid into the annular sedimentation compartment to be taken care of either by permitting the liquid to overflow the upper edge of the baffle or by permitting the liquid to flow through a series of holes located in the upper portion of the baffle or by any other appropriate overflow means. It has been found desirable to maintain the upper edge of the baffle or the series of overflow holes at a point just above the normal still water level of the tank. Active operation of the tank causes a circular motion of the water in the central aerating chamber creating a vortex in the center with a depression of the liquid at this point and a consequent rise at the periphery. This rise of liquid at the periphery causes the liquid to either overflow the baffle or to flow through the openings provided for this purpose.

Operation in this manner tends to provide a more quiet zone in the annular sedimentation compartment and this permits of a more complete separation by sedimentation in this compartment. The liquid reaching the sedimentation compartment by this method has substantially no circular motion. The under pass method usually causes some slight circular or rotating movement to be transmitted to the body of liquid in the sedimentation compartment even in spite of the deflector plates placed therein partially to counteract this tendency.

Where the annular sedimentation compartment is supplied with liquid by the overflow method it is advantageous to provide separate means for intermittently removing accumulated solids deposited on the bottom of the compartment. It is also advantageous to so dispose the baffle overflow passages that these will be staggered in respect to passages provided in the overflow launder for the withdrawal of liquid from the compartment. Thus the liquid in its passage through the annular sedimentation compartment must flow laterally in one direction or another along the compartment in order to find an outlet. This permits a longer time for sedimentation than would be the case if the liquid flowed directly across the annular sedimentation compartment and overflowed into the overflow launder at all points.

I claim:

1. The method of treating sewage which comprises agitating sewage in an open tank by means of a revolving agitator and rakes extending from above the exposed liquid surface to substantially the bottom of the tank thereby causing a vortex in the liquid within the tank and retaining the solids of the sewage in suspension near the center of the tank by means of the formed vortex.

2. The method of treating sewage which comprises continuously introducing raw sewage into the inner chamber of an open tank, agitating the sewage with a revolving agitator provided with rakes extending from above the exposed liquid surface to substantially the bottom of the tank thereby causing a vortex in the agitated sewage within the tank, retaining the solids of the sewage in suspension near the center of the tank by means of the formed vortex and continuously withdrawing together, substantially all the material entering the tank as stable liquids and colloids from a quiescent, annular compartment of the tank.

3. The method of treating sewage which comprises continuously introducing raw sewage into the inner chamber of an open tank, agitating the sewage with a revolving agitator provided with rakes extending from above the exposed surface to substantially the bottom of the tank thereby causing a vortex in the agitated sewage within the tank, retaining the solids of the sewage in suspension near the center of the tank by means of the formed vortex and deflector plates, permitting the aerobic bacteria to act on putrescible material within the tank and continuously withdrawing stable liquids and colloids together from a quiescent, annular compartment of the tank.

4. An apparatus for treating sewage comprising a central aerating and retaining chamber, agitating and swirling means operatively mounted in said aerating chamber, an annular sedimentation compartment surrounding the central portion, a suspended baffle partition separating the two portions extending from above the liquid surface nearly to the bottom of the apparatus, deflecting plates extending from the bottom of the apparatus part way up into the annular sedimentation compartment, an overflow launder in the upper portion of the sedimentation compartment peripherally disposed and operatively connected with a withdrawal pipe.

5. An apparatus for treating sewage comprising a central aerating and retaining chamber, agitating and swirling means operatively mounted in said aerating chamber, means operatively connected with the center of bottom of the central aerating chamber for intermittently withdrawing insoluble residue, an annular sedimentation compartment surrounding the central chamber, a suspended baffle separating the two portions extending from above the liquid surface nearly to the bottom of the apparatus, deflecting plates extending from the bottom of the apparatus part way up into the annular sedimentation compartment, an overflow launder in the upper portion of the sedimentation compartment peripherally disposed and operatively connected with a withdrawal pipe.

6. An apparatus for treating sewage comprising a central aerating and retaining chamber, agitating and swirling means operatively mounted in said aerating chamber extending from above the liquid surface to within substantially three inches of the bottom, means operatively connected with the center of bottom of the central aerating chamber for intermittently withdrawing insoluble residue, an annular sedimentation compartment surrounding the said central chamber, a suspended baffle separating the two portions extending from above the liquid surface nearly to the bottom of the apparatus, deflecting plates extending from the bottom of the apparatus part way up into the annular sedimentation compartment, an overflow launder in the upper portion of the sedimentation compartment peripherally disposed and operatively connected with a withdrawal pipe.

In testimony whereof I affix my signature.

WARREN R. BORST.